(12) United States Patent
Pulvino et al.

(10) Patent No.: US 8,317,317 B2
(45) Date of Patent: Nov. 27, 2012

(54) FOLDING EYEGLASSES

(76) Inventors: Eric Charles Pulvino, Williamsville, NY (US); Deborah Ann Pulvino, Williamsville, NY (US); Linda Marie Deutsch, Rochester, NY (US)

( * ) Notice: Subject to any disclaimer, the term of this patent is extended or adjusted under 35 U.S.C. 154(b) by 132 days.

(21) Appl. No.: 12/856,550

(22) Filed: Aug. 13, 2010

(65) Prior Publication Data

US 2011/0037939 A1 Feb. 17, 2011

Related U.S. Application Data

(60) Provisional application No. 61/274,061, filed on Aug. 13, 2009.

(51) Int. Cl.
*G02C 5/08* (2006.01)

(52) U.S. Cl. ............ 351/63; 351/112; 351/124; 351/157

(58) Field of Classification Search .................... 351/41, 351/63, 112, 124, 133, 156–158
See application file for complete search history.

(56) References Cited

U.S. PATENT DOCUMENTS

| | | | | |
|---|---|---|---|---|
| 5,020,341 | A | * | 6/1991 | Schimko .................... 66/126 R |
| 6,048,061 | A | * | 4/2000 | Chiu ................................ 351/63 |
| 6,752,496 | B2 | | 6/2004 | Conner |
| 7,033,020 | B2 | | 4/2006 | Sawhney |
| 2002/0021405 | A1 | * | 2/2002 | Fukai .............................. 351/57 |

FOREIGN PATENT DOCUMENTS

WO  WO 2005/121871  12/2005

* cited by examiner

*Primary Examiner* — Huy K Mai
(74) *Attorney, Agent, or Firm* — Vincent G. LaTempio; Klass, Stenger & LoTempio

(57) ABSTRACT

Eyeglasses comprising a first frame and a second frame each having an inner end and an outer end. A lens is secured within each frame. A connecting member is fixedly attached to the outer end of its respective frame and has a dovetail groove therein with a magnet secured within the groove for releasably engaging a chain. A first pivotal member is fixedly attached to the inner end of the first frame while a second pivotal member is fixedly attached to the inner end of the second frame thereby permitting pivotal movements along a common longitudinal direction. At least one clip is fixedly attached to at least one connecting member for removably securing the eyeglasses to an article. Each connecting member includes a connecting magnet for releasably engaging with each other when the eyeglasses are folded closed. A chain is releasably secured within the dovetail grooves of the connecting members.

7 Claims, 7 Drawing Sheets

FOLDING EYEGLASSES

This application claims priority of U.S. Provisional Patent Application of Eric Charles Pulvino, Deborah Ann Pulvino, and Linda Marie Deutsch, Ser. No. 61/274,061 for EYEWEAR JEWELRY, filed on Aug. 13, 2009.

BACKGROUND OF THE INVENTION

This patent application pertains to eyeglasses, and more specifically, pertains to foldable eyeglasses which also function as an article of jewelry. For the most part, eyeglasses comprise a rigid eyeglass frame for holding lenses and resting the frame on the bridge of a wearer's nose. The frame is further secured on the wearer through use of a pair of arms connected at one end to frame with the opposite end resting on the wearer's ears. When not being used, traditional eyeglasses are cumbersome or otherwise inconvenient to store upon the person.

Numerous patents have focused on minimizing the footprint of eyeglasses when the eyeglasses are not in use. Many of these patents disclose various designs for folding the eyeglasses upon itself to minimize space and ease storage. For instance, U.S. Pat. No. 6,752,496 discloses a pair of eyeglasses having a hinged bridge and telescoping arms. When in an open, extended position, the eyeglasses form a pair of eyeglasses having the traditional structure of a pair of lenses held in a frame where the bridge of the frame rests on the nose of the wearer, and a pair of arms attached to either end of the frame and extending back so as to rest on the wearer's ears. The arms are designed to telescopically extend and retract thereby decreasing there length when in a closed position. The bridge of the frame has a pair of hinges to allow the lenses to collapse into a compact structure with the shortened arms secured between the lenses. Although the eyeglasses collapse into a compact structure when in a closed position, the eyeglasses are not aesthetically amenable to be worn as a piece of jewelry. Moreover, each lens faces outwardly in the closed position and each is likely to become scratched or otherwise damaged when not being worn.

In U.S. Pat. No. 7,033,020, and its corresponding international application WO2005/121,871, a collapsible eyewear apparatus is disclosed where, when collapsed, the lenses of the eyewear are protected by the apparatus. The apparatus comprises a set of eyewear having a hinge at the bridge of the frame. The frame also has a pair of earpieces which, when extended rest on the wearer's ears; and, when not extended, rest within a protective unit. The protective unit is attached to the eyewear frame and is hinged to cover the lenses when the apparatus is in its closed position. Although this apparatus protects the lenses when the eyewear is not being used, it does not further function as an article of jewelry or other apparel accessory.

An alternative approach, as described in U.S. Pat. No. 6,048,061, is to create a foldable pair of eyeglasses which folds to form a necklace. As disclosed in the '061 patent, the eyeglasses possess a pair of lenses within a frame where the frame has a pivot point located between the lenses permitting eyeglasses to fold along a common longitudinal direction. A chain attaches to each end of the frame permitting the eyeglasses to be worn around the neck. When in use, a wearer holds one side of the opened frame to permit the wearer to look through the lenses. When not in use, the eyeglasses are folded and the compact eyewear is worn about the neck as a necklace. Although much of the bulk of the eyeglasses is eliminated by this system, the folded eyeglasses are limited to use sole as a necklace as the chain is fastened to the eyeglass frame with no other means for securing the folded glasses on the person. A necklace may be appropriate for a female wearer, but not for a male wearer. Moreover, the necklace may interfere with, or be inappropriate for, certain occasions or wearer-desired style. More importantly, the chain is attached to the frame through use of a magnet. However, this design allows the chain to become dislodged from the magnet if the chain or eyeglasses is subjected to a minimal lateral force. Once dislodged, the eyeglasses will fall to the ground and become damaged or destroyed.

Therefore, it can be seen that there is a need for a foldable set of eyeglasses which can be worn as a fashion accessory when not being employed as eyeglasses. This need is fulfilled by the present disclosure comprising a set of eyewear which collapses into a closed position using a central hinge to take on an aesthetically pleasing shape. A magnetic clasp holds the eyewear in the closed position when not in use. The collapsed eyeglasses can be worn as a necklace by means of a detachable chain necklace which is held onto the eyewear through a dovetailed magnetic groove. The dovetailed magnetic groove prevents the chain from becoming accidentally dislodged from the eyeglass frame. The magnet prevents the chain from sliding out of the groove while the dovetail prevents the chain from being pulled free from the frame when subjected to a perpendicularly applied force. Furthermore, attached garment clips further allow the wearer to quickly and easily fasten the collapsed eyewear to his or her personal effects, thereby no longer necessitating the use of a necklace chain.

SUMMARY OF THE INVENTION

It is the object of the disclosure to provide a multifunctional eyeglass apparatus that functions as a standard pair of eyeglasses in an open position and collapse into an aesthetically pleasing shape which can be worn as a necklace or upon a garment when not needed to improve vision.

It is another object of the disclosure to provide a multifunctional eyeglass apparatus which has a detachable chain necklace.

Still another object of the disclosure to provide a multifunctional eyeglass apparatus having an integrated clip for securing the apparatus to a wearer's personal effects.

The objects of the invention are achieved by provision of a pair of eyeglasses having a first frame having an inner end and an outer end, and a second frame having an inner end and an outer end. A first lens secured within the first frame and a second lens secured within the second frame. A first connecting member is fixedly attached to the outer end of the first frame while a second connecting member is fixedly attached to the outer end of the second frame. A first pivotal member is fixedly attached to the inner end of the first frame and a second pivotal member is fixedly attached to the inner end of the second frame and is pivotally connected with the first pivotal member to permit pivotal movements between the first frame and second frame along a common longitudinal direction of the first frame and the second frame. At least one clip is fixedly attached to at least one connecting member for removably securing the eyeglasses to an article. A connecting magnet is attached to each of the first connecting member and the second connecting member for releasably engaging with each other when the pair of eyeglasses is folded to a closed position. Each of the first connecting member and the second connecting member includes a dovetail groove therein with a dovetail groove magnet secured within each dovetail groove for releasably engaging a chain. The chain has a first end releasably secured within the dovetail groove of the first connecting member and a second end releasably secured within the dovetail groove of the second connecting member. The first end of the chain further comprises a dovetail terminus configured to matably engage with the dovetail groove of the first connecting member and wherein the first chain end may only be disengaged from the eyeglasses through lateral movement. The second end of the chain comprises a dovetail terminus configured to matably engage with the dovetail groove of the second connecting member and wherein the second chain end may only be disengaged from the eyeglasses through lateral movement. Each dovetail terminus further comprises a dovetail terminus magnet for releasably engaging with its respective dovetail groove magnet.

DESCRIPTION OF THE DRAWINGS

The present invention and the manner in which it may be practiced is further illustrated with reference to the accompanying drawings wherein.

DETAILED DESCRIPTION OF THE INVENTION

Figure 1:
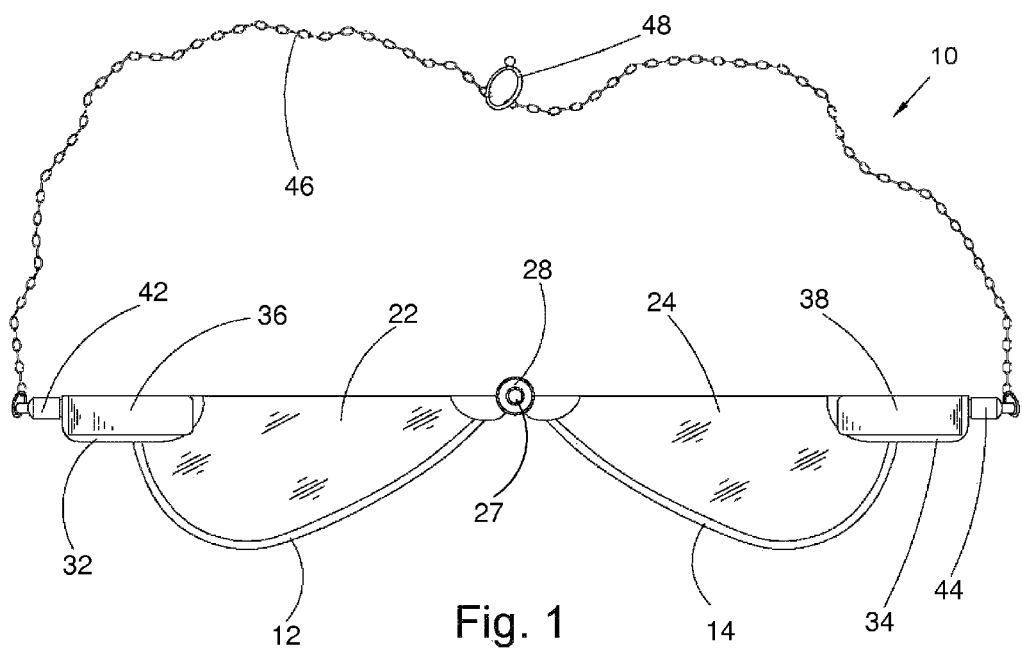
FIG. 1 is a rear view of one embodiment of the present disclosure in the open position.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Traditional eyeglasses are limited in their utility to function only as vision aids. When not needed, traditional eyeglasses are bulky, difficult to secure on the person, and often detrimental to a wearer's style or overall aesthetics. Previous attempts to alleviate these problems have resulted in inferior designs and apparatuses. The present disclosure describes an eyeglass apparatus providing functionality as both a highly accessible set of eyeglasses and as a piece of jewelry or other accessory. When in the open position, the eyewear functions as a standard pair of eyeglasses. The eyewear collapses into a closed position using a central hinge to create an aesthetically pleasing shape which may be worn about the neck using a detachable chain or upon the wearer's personal effect by using an attached garment clip. The detachable chain is removably secured to the eyewear by means of a dovetailed magnetic rail. A magnetic clasp holds the eyewear in the closed position when the apparatus is not in use.

Figure 2:
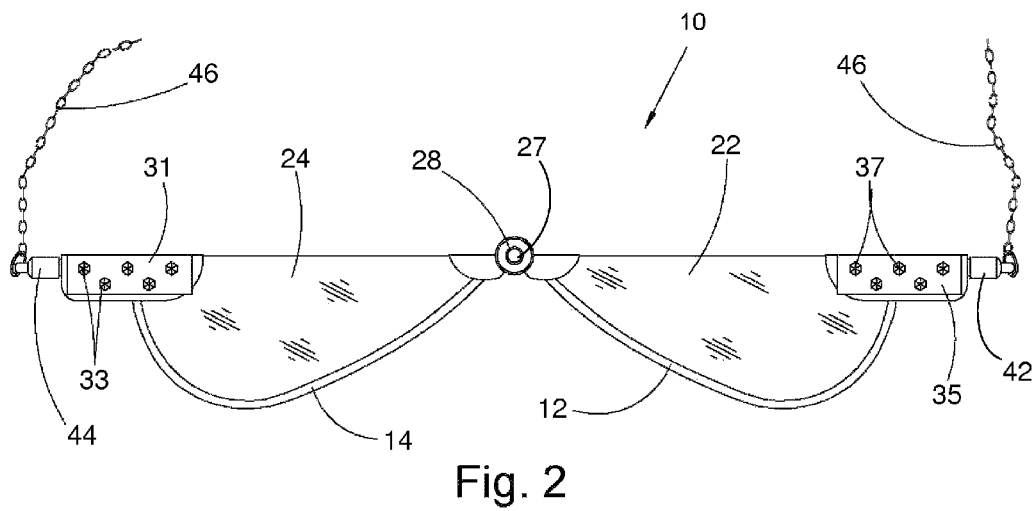
FIG. 2 is a front view of one embodiment of the present disclosure in the open position.
Figure 3:
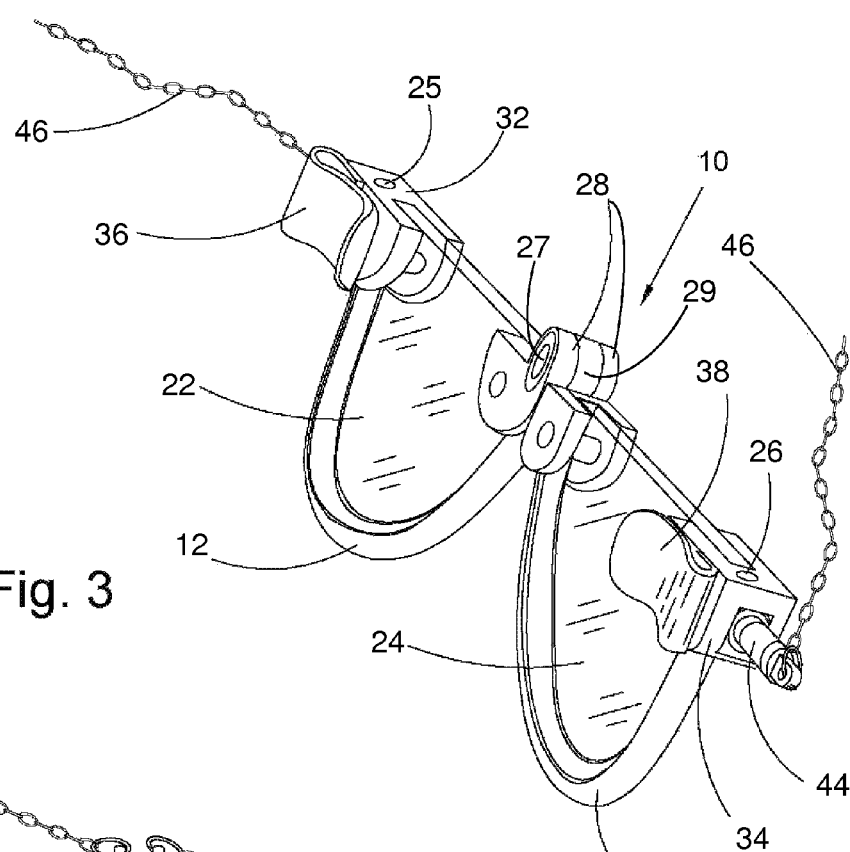
FIG. 3 is a rear perspective view of one embodiment of the present disclosure in the open position.
Figure 7:
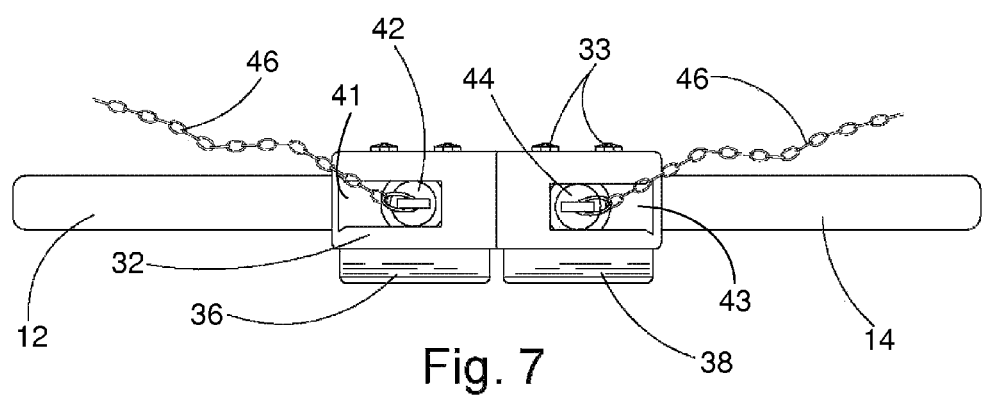
FIG. 7 is a top view of one embodiment of the present disclosure showing the detachable neck chain in a secured position.
Figure 8:
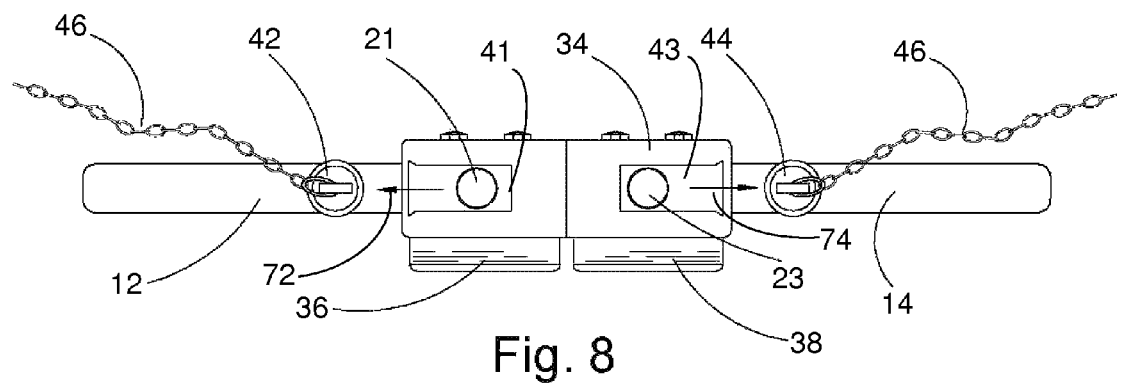
FIG. 8 is a top view of one embodiment of the present disclosure showing the detachable neck chain being removed from its secured position.

Adverting now to the drawings, with reference to FIGS. 1 through 3, a preferred embodiment of the present invention is indicated generally by numeral 10. Eyewear article 10 generally includes two frame subunits comprised generally of frames 12 and 14, two lenses 22 and 24, and a pivoting assembly comprised of outer lugs 28, inner lug 29, and pin 27. Each frame 12 and 14 has a groove defined on the inner side thereof for housing lens 22 and 24, respectively. Each frame 12 and 14 further comprises an inner end to which outer lugs 28 and inner lug 29, respectively, are securely affixed. Each lug unit 28 and 29 includes a hole (not shown) defined therein. Inner lug 29 fits within outer lugs 28 such that the holes are aligned such that the inner lug 29 is secured in position between outer lugs 28 by pin or screw 27 which is extended through the holes to provide a pivotal connection therebetween. Further, each frame 12 and 14 comprises an outer end to which a connecting member 32 and 34 is securely attached, respectively. The rear surface of connecting members 32 and 34 are configured with clips 36 and 38, respectively. In another preferred embodiment, the front surface of connecting members 32 and 34 are equipped with a decorative element 31 and 35, respectively, having optional adornments 33 and 37. In the present embodiment, connecting members 32 and 34 further comprise a dovetail groove (as shown in FIGS. 7 through 9) into which a chain end 42 and 44, respectively, are removably inserted. Chain ends 42 and 44 are connected by chain 46. Chain 46 may further contain a fastening element 48. Although fastener 48 is shown as a hoop other types of fasteners may be used, such as but not limited to a clasp, a magnetic closure, or the like. Connecting members 32 and 34 are further equipped with magnets 25 and 26, respectively, wherein magnets 25 and 26 provide a releasable engagement means for connecting members 32 and 34. Although magnets are shown and described, other releasable engagement means may be used, such as but not limited to snaps, hook-and-loop, and the like.

Figure 4:
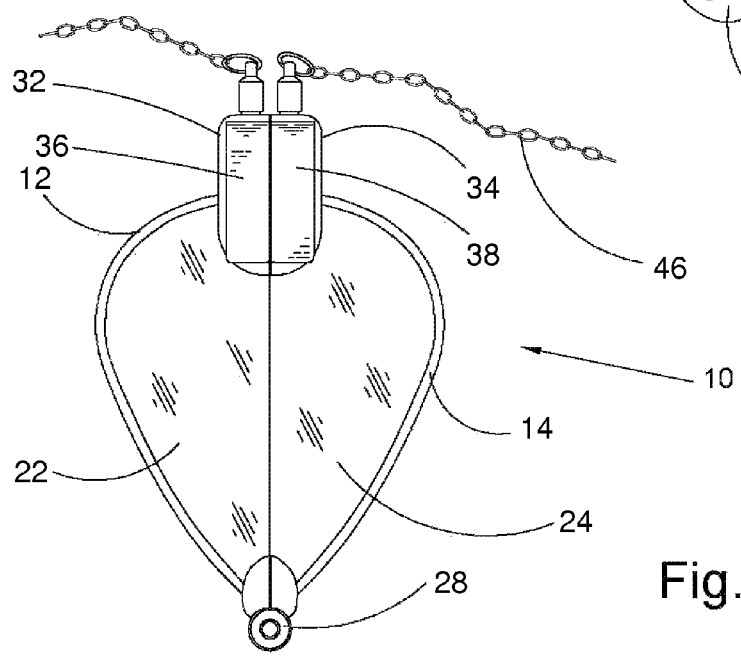
FIG. 4 is a rear view of one embodiment of the present disclosure when in the closed position.
Figure 5A:
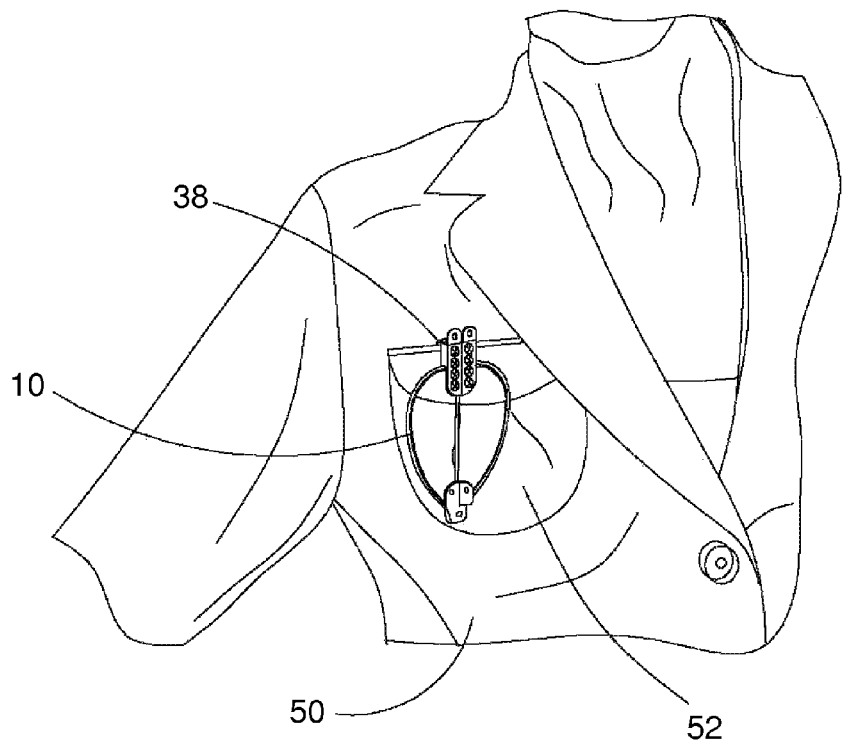
FIG. 5A is an illustrative view of one embodiment of the present disclosure in the closed position showing the embodiment clipped onto an article of apparel.
Figure 5B:
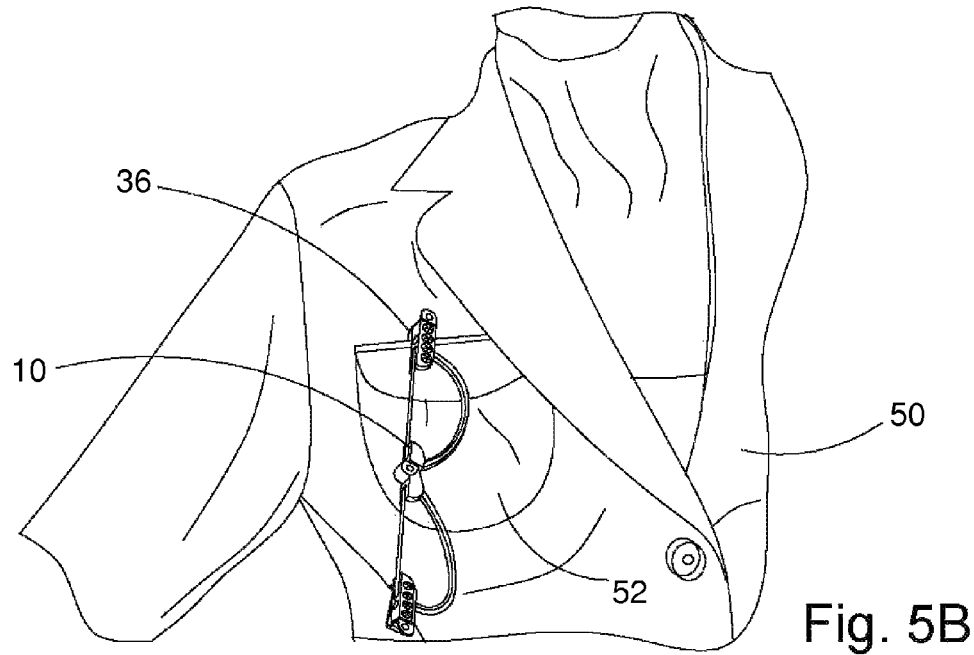
FIG. 5B is an illustrative view of one embodiment of the present disclosure in the open position showing the embodiment clipped onto an article of apparel.
Figure 6:
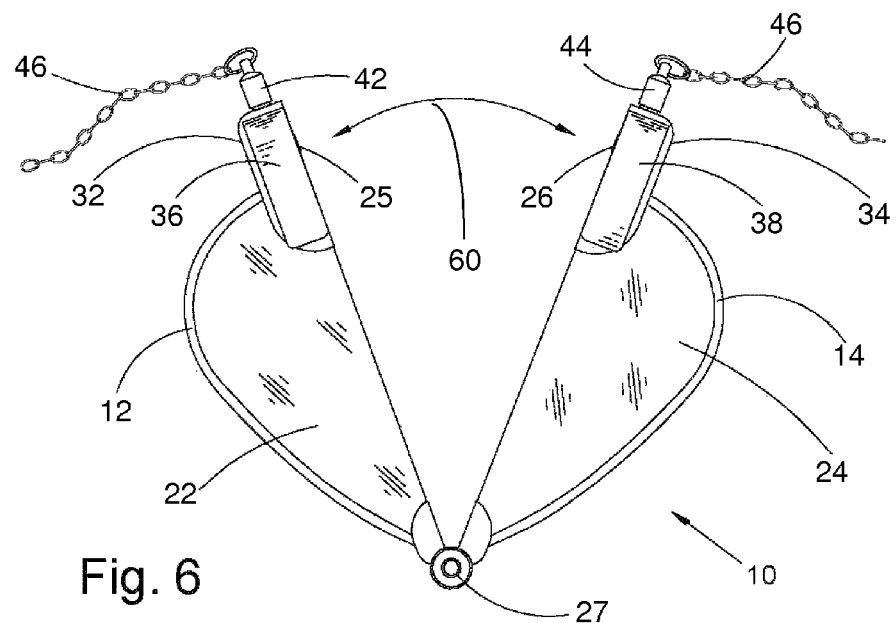
FIG. 6 is a rear view of one embodiment of the present disclosure illustrating in the closing mechanism of the embodiment.

FIG. 4 shows the eyewear in a fully closed position. The eyewear is folded along a longitudinal direction via the pivot assembly. When in the closed position, magnets 25 and 26 (see FIG. 3) attract one another and provide a releasable engagement. When not in use, the eyewear may be worn as a necklace by provision of chain 46. Alternatively, as shown in FIG. 5A, chain 46 is removed and the closed eyewear is removably affixed to a personal effect such as pocket 52 of a blouse or shirt 50 using at least one of clips 36 or 38. Alternatively, eyewear 10 can be removably affixed to a personal effect 52 by either clip 36 or clip 38 when the eyewear is in an open position. FIG. 6 illustrates the pivotal opening of the closed eyewear as shown in FIG. 4. In use, the wearer pivots each lens about pin 27 of the pivoting assembly as shown generally by arrow 60. Ideally, pivotal opening of the eyewear is limited to the extent shown in FIGS. 1 and 2.

Figure 9A:
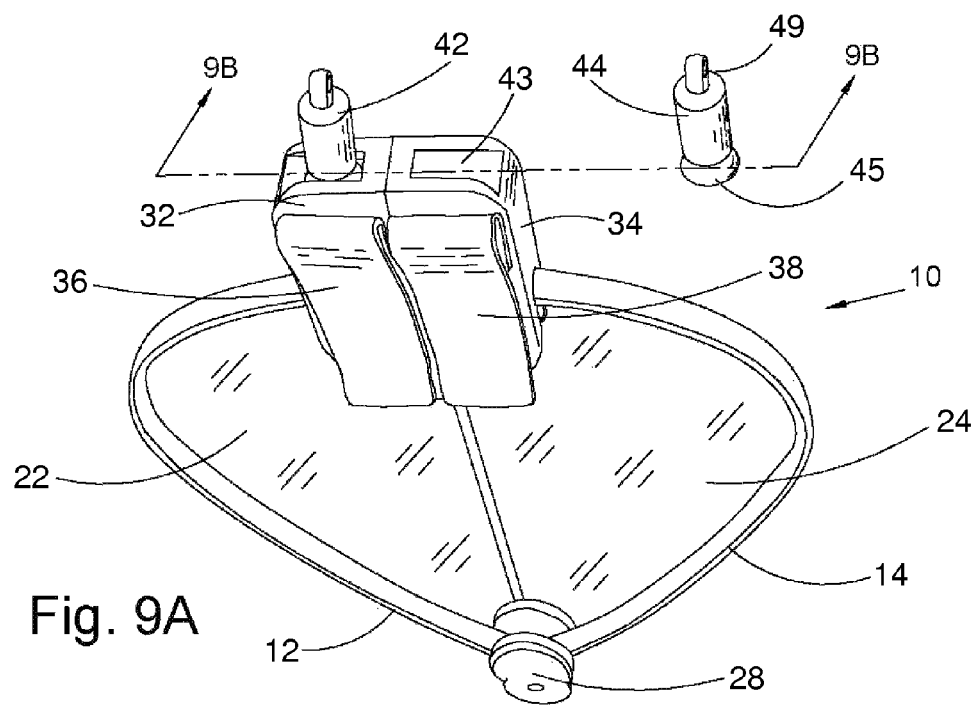
FIG. 9A is a side perspective view of one embodiment of the present disclosure showing the detachable neck chain units.
Figure 9B:
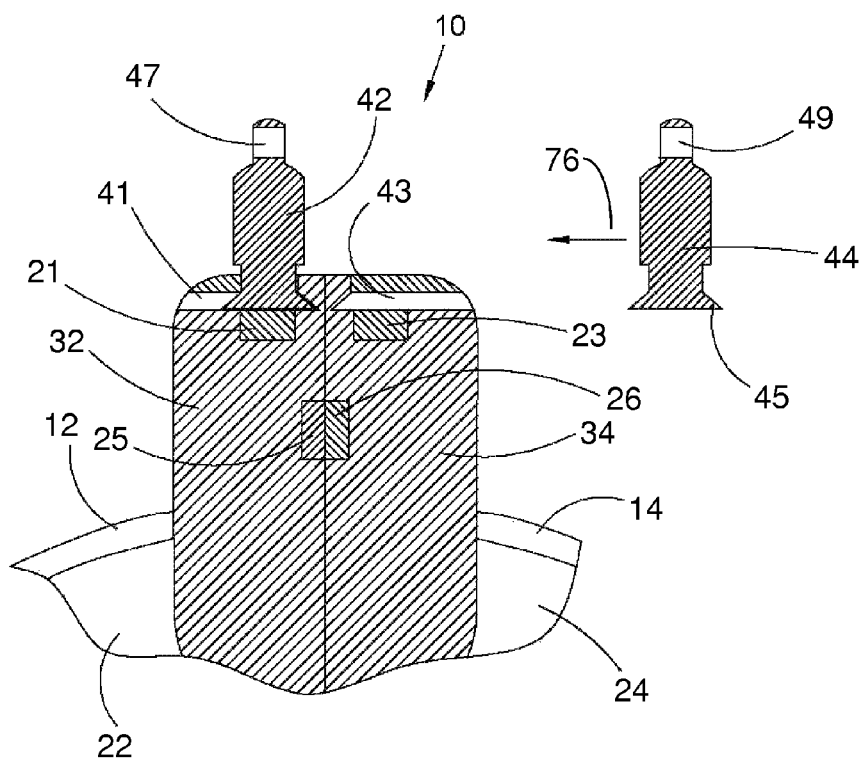
FIG. 9B is a cross-sectional view taken generally along line 9B in FIG. 9A of one embodiment of the present invention.

FIGS. 7 through 9 illustrate the structure and function of the releasable chain and associated mechanism. As shown in FIG. 7, chain ends 42 and 44 are housed within dovetail grooves 41 and 43, respectively. Chain ends 42 and 44 are releasably removed from the grooves as shown by arrows 72 and 74, respectively (see FIG. 8). In one embodiment, chain ends 42 and 44 are constructed of a magnetic material. FIG. 9B is a cross-sectional view of the chain end structure and mechanism as seen generally along line 9B in FIG. 9A. As illustrated by arrow 76, chain end unit 44, having dovetail mating terminus 45, is directed into dovetail groove 43 on connecting member 34 to a position as shown by chain end 42 in its corresponding dovetail groove 41. Preferably, each chain end unit is constructed of a magnetic material, although only a portion of the unit needs to be magnetic, and more particularly the dovetail mating terminus is magnetic. Alternatively, the chain end unit may be non-magnetic but have a magnet embedded within its body (not shown). The magnetic chain ends 42 and 44 are attracted to embedded magnets 21 and 23, respectively, to releasably retain the chain ends within the grooves. The dovetail grooves 41 and 43 prevent the chain ends 42 and 44 from being dislodged or pulled free from the frame units by application of a perpendicularly directed force (i.e. the chain ends will not dislodge longitudinally while the closed eyewear is worn around a wearer's neck when used as a necklace). Magnets 21 and 23 within the dovetail grooves restrict the lateral movement of the chain ends and prevents the chain ends from accidentally sliding out of the groove. Chain 46 is attached to chain ends 42 and 44 by provision of chain attachment posts 47 and 49, respectively.

Figure 10:
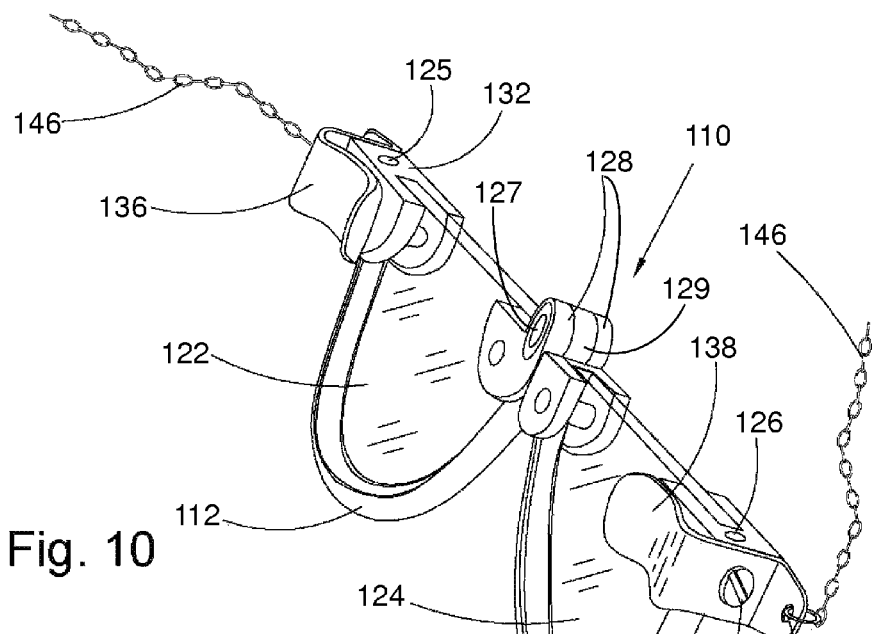
FIG. 10 is a side perspective view of a second embodiment of the present disclosure in the open position.
Figure 11:
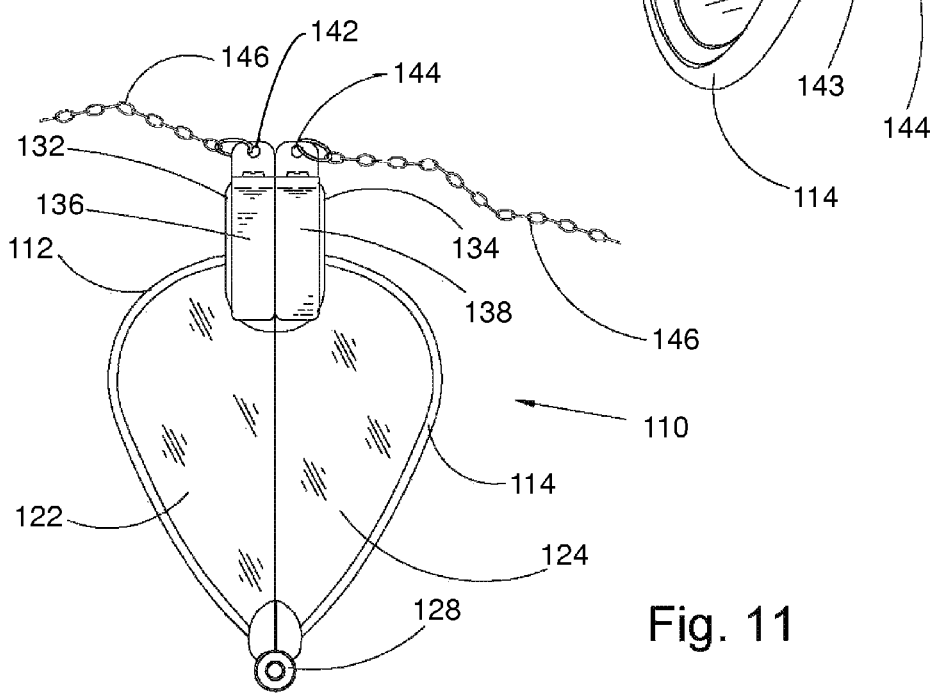
FIG. 11 is a rear view of a second embodiment of the present disclosure in the closed position.
Figure 12:
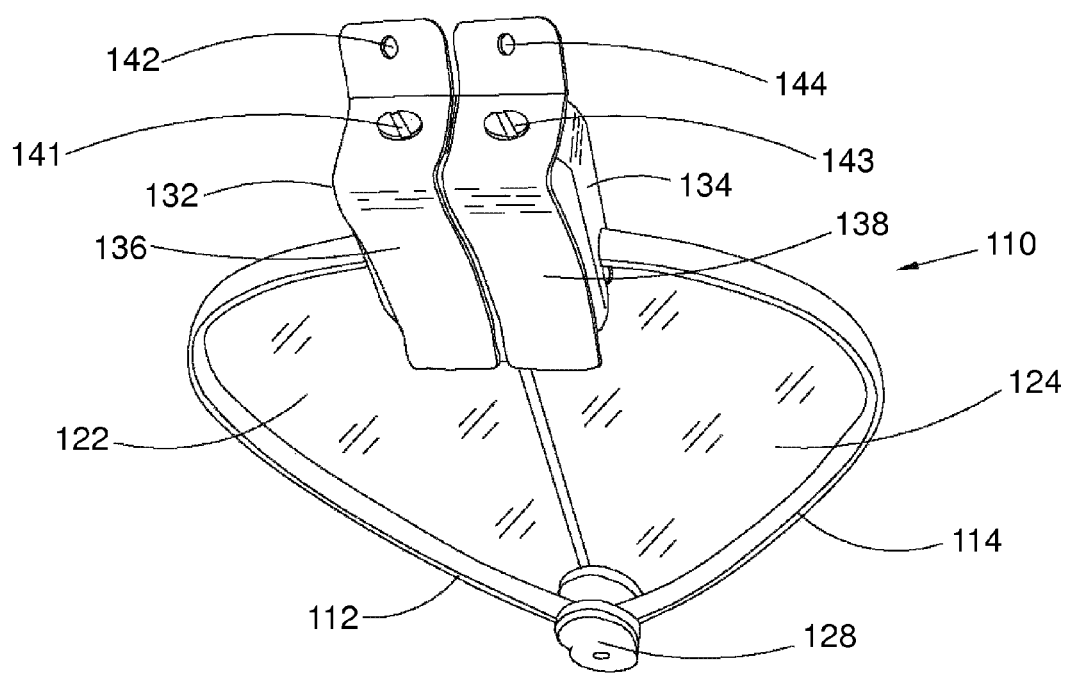
FIG. 12 is a top perspective view of a second embodiment of the present disclosure in the closed position.

FIGS. 10 through 12 show an alternative embodiment of an article of eyewear of the present disclosure as indicated by numeral 110. Eyewear article 110 generally includes two subunits comprised generally of frames 112 and 114, two lenses 122 and 124, and a pivoting assembly comprised of outer lugs 128, inner lug 129, and pin 127. Each frame 112 and 114 includes a groove defined on the inner side thereof for housing lens 122 and 124, respectively. Each frame 112 and 114 further comprises an inner end to which outer lugs 128 and inner lug 129, respectively, are securely affixed. Each lug unit 128 and 129 includes a hole (not shown) defined therein. Inner lug 129 fits within outer lugs 128 such that the holes are aligned such that the inner lug 129 is secured in position between outer lugs 128 by pin or screw 127 which is extended through the holes to provide a pivotal connection therebetween. Further, each frame 112 and 114 comprises an outer end to which a connecting member 132 and 134 are securely attached, respectively. In this alternative embodiment, connecting members 132 and 134 further comprise a clip 136 and 138, respectively, having a chain end extension 142 and 144, respectively, secured onto the connecting members using screws 141 and 143, respectively. Although the clips and chain end extensions are shown as separate units attached by a screw, these units can be created as an integral part of the connecting member in a unibody construction. Alternatively, other means of attachment besides a screw can be employed, such as but not limited to glue, epoxy, weld, rivet, or the like. Chain ends 142 and 144 are connected by chain 146. Connecting members 132 and 134 are further equipped with magnets 125 and 126, respectively, wherein magnets 125 and 126 provide a releasable engagement means for connecting members 132 and 134. Although magnets are shown and described, other releasable engagement means may be used, such as but not limited to snaps, hook-and-loop, and the like.

FIGS. 11 and 12 show the eyewear in a fully closed position. The eyewear is folded along a longitudinal direction via the pivot assembly. When in the closed position, magnets 125 and 126 (see FIG. 10) attract one another and provide a releasable engagement. When not in use, the eyewear may be worn as a necklace by provision of chain 146. Alternatively, the closed eyewear is removably affixed to a personal effect such as pocket of a blouse or shirt using at least one of clips 136 or 138. Alternatively, eyewear 110 can be removably affixed to a personal by either clip 136 or clip 138 effect when the eyewear is in an open position. In use, the wearer pivots each lens about pin 127 of the pivoting assembly. Ideally, pivotal opening of the eyewear is limited to the extent shown in FIG. 10.

Although the invention has been described with reference to certain preferred embodiments, it will be appreciated by those skilled in the art that modifications and variations may be made without departing from the spirit and scope of the invention. It should be understood that applicant does not intend to be limited to the particular details described above and illustrated in the accompanying drawings.

What is claimed is:

1. A pair of eyeglasses, comprising:
    a first frame having an inner end and an outer end;
    a second frame having an inner end and an outer end;
    a first lens secured within the first frame;
    a second lens secured within the second frame;
    a first connecting member fixedly attached to the outer end of the first frame;
    a second connecting member fixedly attached to the outer end of the second frame;
    wherein each of the first connecting member and the second connecting member includes a dovetail groove therein with a dovetail magnet secured within each dovetail groove for releasably engaging a chain; the chain having a first end releasably secured within the dovetail groove of the first connecting member and a second end releasably secured within the dovetail groove of the second connecting member; wherein the first end of the chain comprises a dovetail terminus configured to matably engage with the dovetail groove of the first connecting member and wherein the first chain end may only be disengaged from the eyeglasses through lateral movement; and the second end of the chain comprises a dovetail terminus configured to matably engage with the dovetail groove of the second connecting member and wherein the second chain end may only be disengaged from the eyeglasses through lateral movement;
    a first pivotal member fixedly attached to the inner end of the first frame;
    a second pivotal member fixedly attached to the inner end of the second frame and pivotally connected with the first pivotal member to permit pivotal movements between the first frame and second frame along a common longitudinal direction of the first frame and the second frame;
    and
    a connecting magnet attached to each of the first connecting member and the second connecting member for releasably engaging with each other when the pair of eyeglasses is folded to a closed position.

2. The eyeglasses of claim 1 wherein each dovetail terminus further comprises a dovetail terminus magnet for releasably engaging with its respective dovetail magnet.

3. The eyeglasses of claim 1 wherein the eyeglasses further comprise a first clip fixedly attached to the first connecting member for removably securing the eyeglasses to an article; and a second clip fixedly attached to the second connecting member for removably securing the eyeglasses to an article.

4. The eyeglasses of claim 1 further comprising a chain having a first end fixedly attached to the first connecting member and a second end fixedly attached to the second connecting member.

5. A pair of eyeglasses, comprising:
- a first frame having an inner end and an outer end;
- a second frame having an inner end and an outer end;
- a first lens secured within the first frame;
- a second lens secured within the second frame;
- a first connecting member fixedly attached to the outer end of the first frame having a dovetail groove therein with a dovetail groove magnet secured within the dovetail groove for releasably engaging a chain;
- a second connecting member fixedly attached to the outer end of the second frame having a dovetail groove therein with a dovetail magnet secured within the dovetail groove for releasably engaging a chain;
- a first pivotal member fixedly attached to the inner end of the first frame;
- a second pivotal member fixedly attached to the inner end of the second frame and pivotally connected with the first pivotal member to permit pivotal movements between the first frame and second frame along a common longitudinal direction of the first frame and the second frame;
- at least one clip fixedly attached to at least one connecting member for removably securing the eyeglasses to an article;
- each of the first connecting member and the second connecting member includes a connecting magnet attached thereto for releasably engaging with each other when the pair of eyeglasses is folded to a closed position; and
- a chain having a first end releasably secured within the dovetail groove of the first connecting member and a second end releasably secured within the dovetail groove of the second connecting member wherein the first end of the chain comprises a dovetail terminus configured to matably engage with the dovetail groove of the first connecting member and wherein the first chain end may only be disengaged from the eyeglasses through lateral movement; and the second end of the chain comprises a dovetail terminus configured to matably engage with the dovetail groove of the second connecting member and wherein the second chain end may only be disengaged from the eyeglasses through lateral movement.

6. The eyeglasses of claim 5 wherein each dovetail terminus further comprises a dovetail terminus magnet for releasably engaging with its respective dovetail magnet.

7. The eyeglasses of claim 5 wherein the eyeglasses further comprise a first clip fixedly attached to the first connecting member for removably securing the eyeglasses to an article; and a second clip fixedly attached to the second connecting member for removably securing the eyeglasses to an article.

* * * * *